United States Patent Office 3,415,728
Patented Dec. 10, 1968

3,415,728
PHOTOPOLYMERIZATION OF CYCLOTRISILOXANES
Edgar E. Bostick Scotia, N.Y., assignor to General Electric Company, a corporation of New York
No Drawing. Filed Mar. 17, 1967, Ser. No. 623,811
3 Claims. (Cl. 204—159.13)

ABSTRACT OF THE DISCLOSURE

Certain cyclotrisiloxanes are photopolymerized employing a heat activated zinc chalcogen catalyst to linear organopolysiloxane gums. These gums can be converted to silicone elastomers by conventional means and also are useful as viscosity modifiers.

---

This disclosure is concerned with the process for the polymerization of certain cyclotrisiloxanes by photopolymerization techniques. Hexamethylcyclotrisiloxane, cis-2,4,6-trimethyl-2,4,6-triphenylcyclotrisiloxane and trisiloxanes of the formula

I

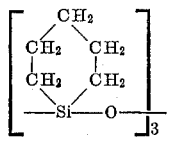

and mixtures thereof can be polymerized to yield high molecular weight linear organopolysiloxanes by contacting said cyclotrisiloxane or mixture thereof with an activated zinc chalcogen and subjecting the resultant mixture to light having a wave length of from 3200 angstgroms to 7000 angstroms. The linear organopolysiloxanes produced by this process are linear organopolysiloxane gums which can be converted to silicone elastomers that have outstanding thermal stability and electrical properties. These linear organopolysiloxanes are of extremely high molecular weight and also find use as viscosity modifiers. This disclosure is also concerned with zinc chalcogens which are coated with certain linear organopolysiloxane in accordance with the disclosed process. These coated zinc chalcogens are useful as fillers for elastomers where hydrophobic properties are desired and as a charge carrier in electrostatic printing devices.

Heretofore, it has been known to polymerize cyclic diorganosiloxanes to yield linear diorganopolysiloxanes which were useful in the preparation of diorganopolysiloxane elastomers. The prior art processes consisted of treating the cyclic siloxanes with an alkaline catalyst such as potassium hydroxide, rubidium hydroxide, or cesium hydroxide and their respective silanolates.

It is an object of this invention to polymerize certain cyclotrisiloxanes by photoexcitation employing an activated zinc chalcogen catalyst.

In accordance with the process of this invention, a cyclotrisiloxane selected from the class consisting of hexamethylcyclotrisiloxane, cis-2,4,6-trimethyl-2,4,6-triphenylcyclotrisiloxane and cyclosiloxanes of Formula I and mixtures thereof, is mixed with an activated zinc chalcogen catalyst and the resulting mixture subjected to irradiation by means of a light source which provides emission between 3200 angstroms and 7000 angstroms. By this process, the cyclotrisiloxane is polymerized to linear organopolysiloxanes without any rearrangement of the cyclic trisiloxanes to yield other cyclosiloxanes or without any depolymerization of the linear organopolysiloxane polymer thus formed to yield other cyclic polysiloxanes as occurs in the heretofore mentioned prior art processes.

The temperature at which the process of this invention is conducted is not narrowly critical and can very from as low as 20° C. to as high as 150° C. It is preferred, however, to employ temperatures in the range of from about 25° C. to about 75° C. for conducting the process of this invention.

A solvent is not necessary in the practices of the invention. However, a solvent is sometimes useful in order to bring the cyclosiloxane in contact with the zinc chalcogen catalyst prior to the exposure of the mixture to the photoing the mixture to the photoexcitation. Solvents which can excitation. The solvent is generally removed before expose be employed are, for example, benzene, toluene, xylene, n-hexane, n-pentane, n-heptane, etc.

The amount of the activated zinc chalcogen catalyst employed in the process of this invention is not narrowly critical and can range from 1 part to 1600 parts of the activated zinc chalcogen per 100 parts, by weight, of the cyclotrisiloxane. To obtain high yields and for ease of recovery of the linear organopolysiloxane gums, it is particularly preferred to employ 1 part, by weight, of the zinc chalcogen for each part, by weight, of the cyclotrisiloxane.

In producing the high molecular weight organopolysiloxanes in accordance with the process of this invention, one also produces a zinc chalcogen which is coated with said high molecular weight organopolysiloxanes. It is, of course, apparent that the higher the zinc chalcogen to cyclotrisiloxane ratio, the greater the amount of the coated zinc chalcogen which will be produced. These coated zinc chalcogens are useful as hydrophobic fillers for silicone elastomers, etc. The coated zinc sulfides are useful in producing electroluminescent photoconductive devices by known processes. The coated zinc oxides also find use in electrostatic printing processes in that such coatings reduce the susceptibility of the zinc oxide charge carrier to conditions where high amounts of water vapor are encountered.

The zinc chalcogens which can be employed as a catalyst in the process of this invention include zinc oxide, zinc sulfide, zinc telluride and zinc selenide.

The zinc chalcogen catalyst which is employed in the process of this invention is one which has been heat-activated. The general procedure for the activation of the zinc chalcogen is as follows: The zinc chalcogen is placed in a reaction vessel and heated to a temperature of from 200° C. to 550° C. and at pressures ranging from 760 mm. of mercury to $10^{-6}$ mm. of mercury. Heating at this temperature and pressure activates the zinc chalcogen so as to cause the polymerization of the cyclotrisiloxanes when exposed to irradiation in the wave lengths of from 3200 to 7000 angstroms.

The linear organopolysiloxanes produced by the process of this invention are of extremely high molecular weight and can be compounded with filters, peroxides and other extenders as are commonly employed in the art and cured to elastomers by heat. Because of the extremely high molecular weight of these linear organopolysiloxanes, they also find use as viscosity modifiers.

The following examples serve to further illustrate this invention. All parts are by weight unless otherwise expressly stated.

Example 1

A Pyrex glass ampoule containing 2 grams of cis-2,4,6-trimethyl-2,4,6-triphenylcyclotrisiloxane dissolved in 10 ml. of normal hexane was degassed, sealed and fitted to a reactor consisting of a calcium sulfate packing and a 22 x 100 mm. quartz tube. Spectroscopically pure zinc oxide (2 grams) was placed in the quartz tube. The apparatus was evacuated and baked at 425° C. for 16 hours. The break seal on the trisiloxane-containing ampoule was cracked and the solution filtered past the calcium sulfate to the zinc oxide. The n-hexane was then flashed off and the reaction tube sealed under $10^{-6}$ mm. of mercury pressure. The tube was then briefly heated to 150° C. to melt the cyclotrisiloxane. The cyclotrisiloxane and zinc oxide mixture was then layered on the tube wall. The mixture was then illuminated for 31 hours with 125 watt high pressure mercury lamp with a Pyrex window which transmitted light having a wave length of from 3200 to 7000 angstroms. The ampoule was then cracked and the reaction product was extracted with benzene. The benzene extract was filtered and dried to crystals and treated with hot ethanol to remove the cyclic siloxanes. A polymer having an intrinsic viscosity of 2.65 dl./gram in benzene at 25° C. was isolated.

Example 2

A 12 mm. break seal Pyrex glass tube was fitted with a 14/35 standard taper joint and constricted for sealoff. Into this tube was charged 2 grams of cis-2,4,6-trimethyl-2,4,6-triphenylcyclotrisiloxane. The trisiloxane was melted and degassed on the vacuum line to $1^{-5}$ mm. of mercury. The tube was sealed and fastened to a heavy-wall Pyrex tube (½″ diameter) which contained zinc oxide. The Pyrex tube was then evacuated and the zinc oxide was flamed thoroughly until the thermochromic region was evident for three cycles of 10 to 15 minutes each. The Pyrex tube was then allowed to cool to room temperature and the break seal opened on the cyclotrisiloxane which was transfered to the zinc oxide by melting. The Pyrex tube of zinc oxide and cyclotrisiloxane was then placed at a distance of from four to six inches from the source in the beam of a 125 watt Hanovia Lamp (described in Example 1) for 72 hours. At the end of this period, the Pyrex tube was opened and the polymer and zinc oxide extracted with benzene. The benzene extract was then filtered and dried to a mass of crystals. The crystals were extracted with hot ethanol to remove the cyclotrisiloxane. The residue weighing 300 mg. was a methylphenylpolysiloxane polymer and was found to have an intrinsic viscosity of 2.78 deciliters per gram in benzene at 25° C. The ethanol extract was dried to white crystals which were analyzed by gas-phase chromatography and found to be cis-2,4,6-trimethyl - 2,4,6 - triphenylcyclotrisiloxane which indicated that no isomerization or equilibration had occurred during the polymerization.

Example 3

In this example a series of polymerizations of cis-2,4,6-trimethyl-2,4,6-triphenylcyclotrisiloxane were run employing activated zinc oxide to show the effect of different zinc oxide to cyclosiloxane ratios.

In these runs cis-2,4,6-trimethyl-2,4,6-triphenylcyclotrisiloxane (2.5 grams) was intimately mixed with active zinc oxide in the ratios shown in a Pyrex reactor. The zinc oxide was activated by heating it to a temperature of 500° C. for 16 hours under $10^{-5}$ millimeters of mercury pressure. The reaction mixtures were exposed to a 125 watt high pressure mercury arc ultraviolet lamp beam (described in Example 1) at a distance of about six inches from the source for 72 hours. The reaction vessels were rotated slowly during this exposure. The maximum temperature reached at the reaction vessel wall was 50° C. At the end of the reaction time, the vessels were opened and the polymer isolated by extraction with benzene, filtered to remove catalysts, dried and further extracted with ethanol to remove cyclosiloxanes.

The results of the polymerizations together with the intrinsic viscosity measurements in deciliters per gram as measured in benzene at 25° C. are given in the following table.

TABLE I

| ZnO to Cyclotrisiloxane Weight Ratio | Percent Conversion | Intrinsic Viscosity |
| --- | --- | --- |
| 1/1 | 5–10 | 5–10 |
| 2/1 | 67 | 15–18 |
| 4/1 | 60–75 | >18 |

The polymers were very tough and elastic materials which could be crosslinked by conventional peroxide techniques to yield useful elastomers. Analysis of the polymers by proton magnetic resonance indicates that from 60 to 65% of the units of the polymethylphenylsiloxane are in an isotactic configuration while the remaining 35–40% are in a heterotactic configuration.

Example 4

A tube was prepared from heavy wall 25 mm. Pyrex with a 12 mm. quartz tube sealed to the bottom of the Pyrex tube as a pot. Into the quartz pot was placed 5 grams of reagent grade zinc oxide. The tube was then sealed to a vacuum manifold to which was sealed another ampoule containing 30 grams of hexamethylcyclotrisiloxane. The apparatus was degassed and the zinc oxide then heated with a torch to approximately 500° C. for at least 45 minutes at a pressure of $1 \times 10^{-6}$ mm. of mercury. The zinc oxide was then cooled to room temperature, and the break seal to the hexamethylcyclotrisiloxane was cracked and the siloxane was sublimed into the zinc oxide under vacuum. The tube with the zinc oxide and hexamethylcyclotrisiloxane was sealed off and then placed in a beam of an ultra violet lamp of 15 watt capacity for 60 hours. The tube was then resealed to the vacuum line and the excess hexamethylcyclotrisiloxane distilled off under vacuum. The polymer was then recovered by dissolving the polymer in benzene and evaporation of the benzene.

The polymers formed in this manner were found to have intrinsic viscosities of approximately 6 dl./gram in benzene at 25° C.

Example 5

Cis-2,4,6-trimethyl-2,4,6-triphenylcyclotrisiloxane (5.25 grams) was dissolved in 75 ml. of benzene and thoroughly degassed on a vacuum line at $10^{-6}$ ml. of mercury pressure. This degassed solution was then mixed with 5 grams of zinc sulfide (which had previously baked for 16 hours at 250° C.). The benzene was removed by flash distillation and the reaction vessel was placed in the beam of a Hanovia Lamp (previously described in Example 1). The reaction mixture was exposed to the beam for approximately 60 hours. The reaction vessel was then opened and the mixture thoroughly extracted with ethanol to remove unreacted cyclics and then with benzene in order to remove polymer. The unreacted cyclics were analyzed to show that no by-product had been formed during the polymerization. The resulting poly(methylphenylsiloxane) (25% conversion) was a white elastomer.

It will, of course, be apparent to those skilled in the art that modification other than those set forth in the above examples can be employed in the process of this invention without departing from the scope thereof.

What is claimed is:

1. A process for the polymerization of a cyclotrisiloxane selected from the class consisting of hexamethylcyclotrisiloxane, cis-2,4,6-trimethyl-2,4,6-triphenylcyclotrisiloxane and a cyclosiloxane of the formula,

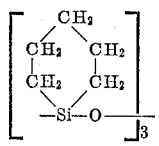

and mixtures thereof to produce linear organopolysiloxanes which comprises contacting said cyclotrisiloxanes with a heat activated zinc chalcogen, said zinc chalcogen having been activated by heating to a temperature of from 200° C. to 550° C. at pressures of from $10^{-6}$ to 760 millimeters of mercury, and subjecting the resultant mixture to light having a wave length of from 3200 angstroms to 7000 angstroms, whereby said cyclosiloxane is polymerized to a linear organpolysiloxane.

2. The process as claimed in claim 1 wherein said cyclotrisiloxane is cis-2,4,6-trimethyl-2,4,6-triphenyl-cyclotrisiloxane.

3. A polymethylphenylpolysiloxane produced in accordance with the procedure of claim 2 having an intrinsic viscosity of at least 15 deciliters per gram in benzene at 25° C.

References Cited

UNITED STATES PATENTS

| 2,904,481 | 9/1959 | Lawton et al. | 204—159.13 |
| 3,294,740 | 12/1966 | McVannel | 260—46.5 |
| 3,328,346 | 6/1967 | Spork | 204—159.13 |
| 3,305,524 | 2/1967 | Brown et al. | 260—46.5 |

FOREIGN PATENTS

| 957,255 | 5/1964 | Great Britain. |
| 999,125 | 7/1965 | Great Britain. |

DONALD E. CZAJA, *Primary Examiner.*

M. I. MARQUIS, *Assistant Examiner.*

U.S. Cl. X.R.

260—46.5, 37